United States Patent [19]

Izutsu et al.

[11] Patent Number: 5,586,952
[45] Date of Patent: Dec. 24, 1996

[54] HYDRAULIC AUTOTENSIONER

[75] Inventors: Tomoyoshi Izutsu; Kazuki Kawashima, both of Iwata, Japan

[73] Assignee: NTN Corporation, Osaka, Japan

[21] Appl. No.: 506,564

[22] Filed: Jul. 25, 1995

[30] Foreign Application Priority Data

Jul. 26, 1994 [JP] Japan .................................. 6-174325

[51] Int. Cl.[6] .................................................. F16H 7/08
[52] U.S. Cl. .............................................. 474/110; 474/138
[58] Field of Search .................................. 474/138, 101, 474/104, 110, 136

[56] References Cited

U.S. PATENT DOCUMENTS

| | | | |
|---|---|---|---|
| 4,940,447 | 7/1990 | Kawashima et al. | 474/138 X |
| 4,985,009 | 1/1991 | Schmidt et al. | 474/110 |
| 4,986,796 | 1/1991 | Kawashima et al. | 474/101 |
| 5,104,359 | 4/1992 | Shirai et al. | 474/110 |

*Primary Examiner*—Roger J. Schoeppel
*Attorney, Agent, or Firm*—Wenderoth, Lind & Ponack

[57] ABSTRACT

A hydraulic autotensioner having a close-bottomed body in which is sealed hydraulic oil. A plunger is slidably mounted in the body with a gap formed therebetween through which the hydraulic oil can leak. The plunger is formed with a hole in the top thereof, and a return passage extending through the plunger from the bottom of the hole to the bottom of the plunger. A rod, having its bottom end inserted in the hole, is provided with a rod spring for biasing the rod in such a direction so as to protrude out of the body. A plunger spring is provided for urging the plunger against the bottom end of the rod. Also, a valve seat is provided on the bottom of the hole so as to be brought into close contact with the bottom end of the rod. The return passage is opened and closed by axial displacement of the rod relative to the valve seat.

10 Claims, 5 Drawing Sheets

5,586,952

HYDRAULIC AUTOTENSIONER

BACKGROUND OF THE INVENTION

This invention relates to a hydraulic autotensioner for keeping constant the tension in a belt such as a timing belt for driving camshafts of an automotive engine or a belt for driving engine auxiliaries such as an alternator.

A conventional hydraulic autotensioner is disclosed in Unexamined Japanese Utility Model Publication 5-8099. FIG. 6 shows this autotensioner. It has a cylindrical body 30 in which is sealed a hydraulic oil, and a plunger 31 slidably mounted in the body 30. A narrow gap is provided between the body 30 and the plunger 31 through which the hydraulic oil can leak. The plunger 31 has a hole 32 in the top thereof in which is inserted the bottom end of rod 33. The plunger 31 partitions the interior of the body 30 into a pressure chamber 34 and a reservoir chamber 36. The pressure chamber 34 houses a plunger spring 35 which biases the plunger 31 upward to press it against the bottom end of the rod 33. Mounted in the reservoir chamber 36 is a rod spring 37 by which the rod 33 is urged in such a direction as to protrude from the body 30.

The pressure chamber 34 and the reservoir chamber 36 communicate with each other through a return passage 38 formed in the plunger 31 and the rod 33. A check valve 39 is provided at the bottom end of the passage 38. It prevents the flow of hydraulic oil from the pressure chamber 34 to the reservoir chamber 36 through the passage 38.

The check valve 39 comprises a check ball 40 for opening and closing the bottom end of the return passage 38, and a retainer 41 for restricting the movement of the check ball 40.

This autotensioner is mounted with the top end of the rod 33 pressed against a pivotable pulley arm 42. A tension pulley 43 carried on the pulley arm 42 is thus biased in such a direction as to increase the tension in a belt 44.

If the tension in the belt 44 begins to increase in this state, the rod 33 is pushed into the body 30, so that the pressure in the pressure chamber 34 increases. The pressure in the pressure chamber thus dampens the downward movement of the rod 33. When the force urging the rod 33 downward exceeds the pressure in the pressure chamber 34, the hydraulic oil in the pressure chamber 34 begins to leak through the narrow gap 45 formed between the sliding surfaces of the body 30 and the plunger 31, allowing a gradual descent of the plunger 31. When the force urging the rod 33 downward becomes equal to the biasing force of the spring 37, the plunger 31 will stop.

When the belt 44 slackens, the rod 33, biased by the rod spring 37, protrudes quickly from the body, thus eliminating any slackening of the belt 44. As the rod 33 protrudes, the plunger 31 moves upward with the rod, so that the pressure in the pressure chamber 34 begins to decrease, which causes the check ball 40 to move down, opening the return passage 38. Thus, the hydraulic oil in the reservoir chamber 36 is allowed to quickly flow into the pressure chamber 34 through the return passage 38.

Thus, this autotensioner shows a larger resistance to the force urging the rod 33 into the body 30. But when this force disappears, the rod is allowed to protrude quickly, thus instantly eliminating any slackening of the belt. As a result, the tension in the belt 44 is kept constant.

One problem of this autotensioner arises from the structure of the check valve 39. Namely, since this check valve is made up of two separate members, i.e. check ball 40 and retainer 41, it is troublesome to assemble and thus its manufacturing cost tends to be high.

Moreover, since the check ball 40 is moved between the open and closed positions according to the pressure in the pressure chamber 34, it is necessary to limit the moving distance of the check ball 40 to a minimum in order that the check ball 40 can return to its closed position with high reliability. This means that the gap between the check ball 40 and the bottom end of the return passage 38 when the ball 40 is in its open position is correspondingly narrow. Thus, when the valve is in its open position, it is impossible to return the hydraulic oil in the reservoir chamber 36 into the pressure chamber 34 with sufficiently high speed, so that the rod 33 and the plunger 31 can not follow the movement of the belt 44 if the belt slackens abruptly.

An object of this invention is to provide a hydraulic autotensioner which is made up of a smaller number of parts, which can be assembled easily, and whose rod and plunger can quickly follow any sudden slackening of the belt.

SUMMARY OF THE INVENTION

According to this invention, there is provided a hydraulic autotensioner including a body having a closed bottom in and containing hydraulic oil. A plunger is slidably mounted in the body with a gap formed therebetween through which the hydraulic oil can leak. The plunger is formed with a rod-receiving hole in the top thereof, and a return passage extends through the plunger from the bottom of the rod-receiving hole to the bottom of the plunger. Also provided are a rod having its bottom end inserted in the rod-receiving hole, and a rod spring mounted on the rod and biasing the rod in such a direction so as to protrude out of the body. Also, a plunger spring is provided for urging the plunger against the bottom end of the rod. A valve seat is provided on the bottom of the rod-receiving hole so as to be brought into close contact with the bottom end of the rod, whereby the return passage is opened and closed by axial displacement of the rod relative to the valve seat.

The plunger spring may be retained between the bottom of the plunger and the bottom of the body.

Otherwise, the rod may be provided at its bottom end with a small-diameter shaft loosely inserted through the return passage and carrying a spring support near its bottom end. The plunger spring may be retained between the spring support and the bottom surface of the plunger.

Also, the plunger spring may be retained between a spring support secured to the bottom end of the rod and a spring support secured to the inner wall of the plunger near the top end of the rod-receiving hole.

The valve seat may be a flat or tapered. If a tapered valve seat is used, the rod should have a spherical bottom end so that the valve seat can be brought into tight contact with the bottom of the rod.

In order to minimize the relative diametric movement between the rod and the plunger, the rod-receiving hole should be a stepped hole, including an upper large-diameter portion and a lower small-diameter portion, the small-diameter portion having a diameter substantially equal to the outer diameter of the rod. The plunger should be formed with axial grooves in the inner peripheral surface of the small-diameter portion.

If the belt slackens suddenly, the rod will protrude quickly, pushed by the rod spring.

As the rod moves upward, the plunger also begins to rise. But due to the pressure difference between the reservoir chamber and the pressure chamber, and the frictional resistance and viscous resistance produced between the plunger and the body, the plunger cannot rise as quickly. Accordingly, the rod rises faster than the plunger, so that the bottom end of the rod will get away from the valve seat, thereby opening the return passage. Thus, the hydraulic oil in the reservoir chamber can flow quickly through the return passage into the pressure chamber, so that the plunger can rise quickly, pushed by the plunger spring until it comes into close contact with the bottom of the rod.

Other features and objects of the present invention will become apparent from the following description made with reference to the accompanying drawings, in which:

DETAILED DESCRIPTION OF THE PREFERRED EMBODIMENT

Now referring to FIGS. 1–5, the embodiments of this invention are described.

Figure 1:
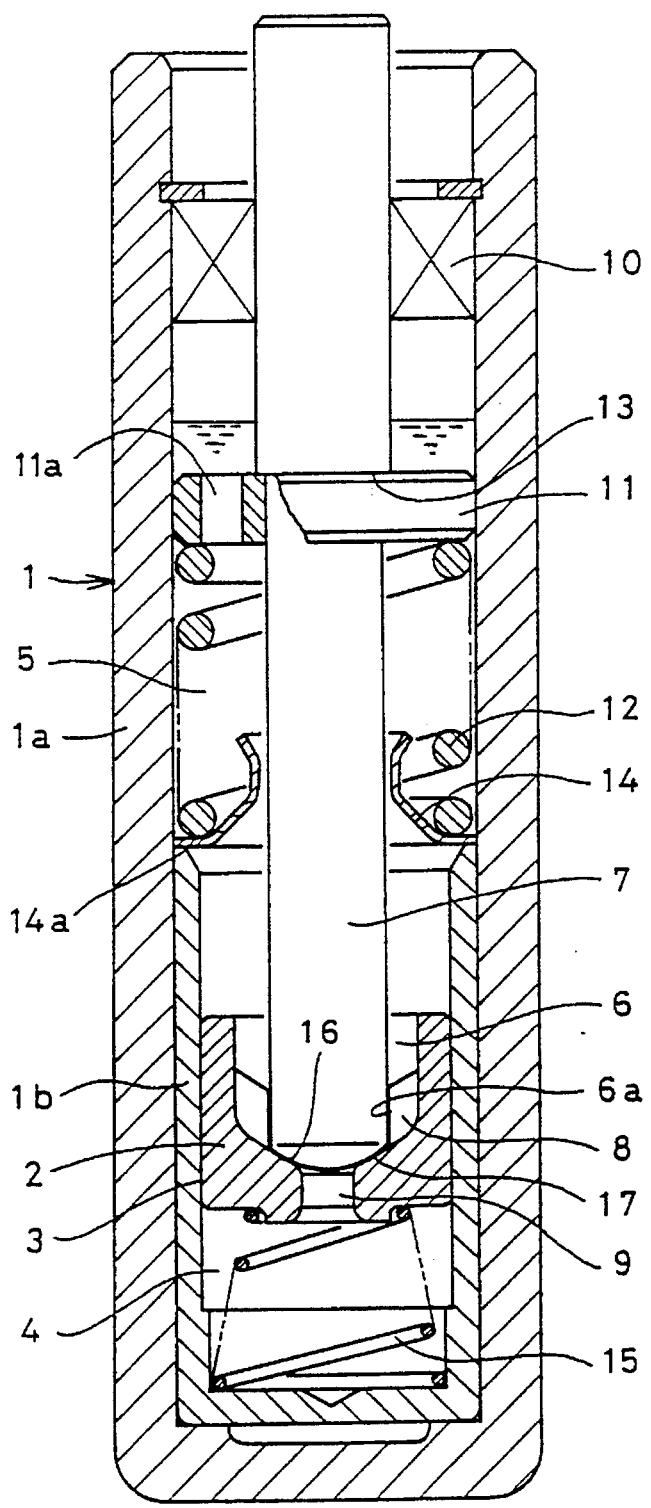
FIG. 1 is a sectional view of a first embodiment of the hydraulic autotensioner according to the invention.
Figure 2:
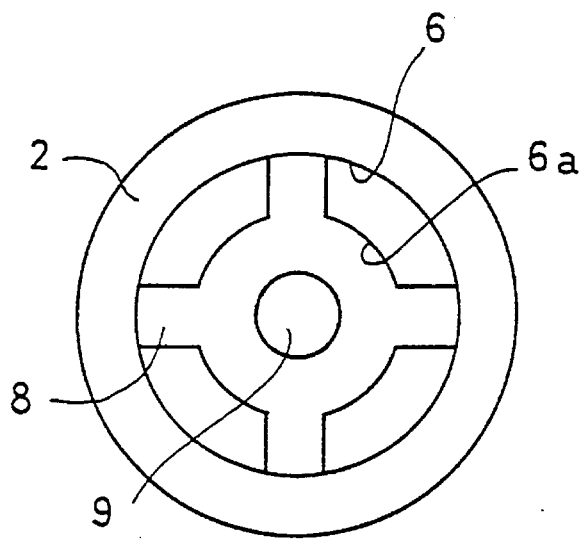
FIG. 2 is a plan view of a plunger of the hydraulic autotensioner shown in FIG. 1.
Figure 3:
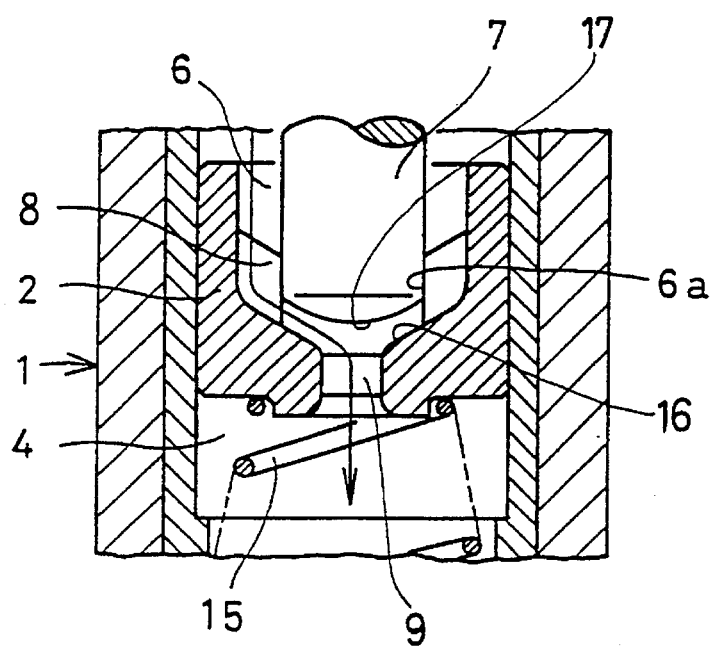
FIG. 3 is a sectional view of the hydraulic autotensioner of FIG. 1, showing an operational state.

FIGS. 1 and 2 show the first embodiment of the autotensioner according to this invention. It has a cylindrical body 1 comprising a close-bottomed outer casing 1a and a close-bottomed inner casing 1b inserted into the outer casing 1a, The body 1 is filled with hydraulic oil.

A plunger 2 is slidably mounted in the inner casing 1b. Formed between the sliding surfaces of the plunger 2 and the inner casing 1b is a narrow gap 3 through which hydraulic oil can leak. The plunger 2 partitions the interior of the body 3 into a lower pressure chamber 4 and an upper reservoir chamber 5.

The plunger 2 is formed, in its top surface, with a stepped hole 6 comprising an upper large-diameter portion and a lower small-diameter portion 6a. The bottom end of a rod 7 is inserted in the small-diameter portion 6a of the hole 6.

The small-diameter portion 6 has substantially the same diameter as the outer diameter of the rod 7 so that the rod is slidable in the small-diameter portion 6a. The plunger 2 is also formed with axial grooves 8 in the inner periphery of the small-diameter portion 6a, and with a return passage 9 extending from the bottom of the small-diameter portion 6a to the bottom surface of the plunger 2.

The upper portion of the rod 7 is slidably supported by a seal member 10 secured to the body 1 near its top opening. The rod 7 has at its mid-portion a shoulder 13 with which a spring support 11 engages. The spring support 11 has holes 11a through which hydraulic oil can flow. A rod spring 12 which engages the spring support 11 urges the rod 7 in such a direction as to protrude from the body 1.

Over the inner casing 1b, a separator 14 is secured to the rod 7. It flares both upward and downward and is provided along its bottom edge with a flange 14a pressed against the top end of the inner casing 1b by the rod spring 12. The separator 14 prevents air from coming into the pressure chamber 4.

A plunger spring 15 provided under the plunger 2 pushes the plunger upward to press a tapered valve seat 16 formed on the bottom of the hole 6 against a spherical bottom surface 17 of the rod 7.

Figure 6:
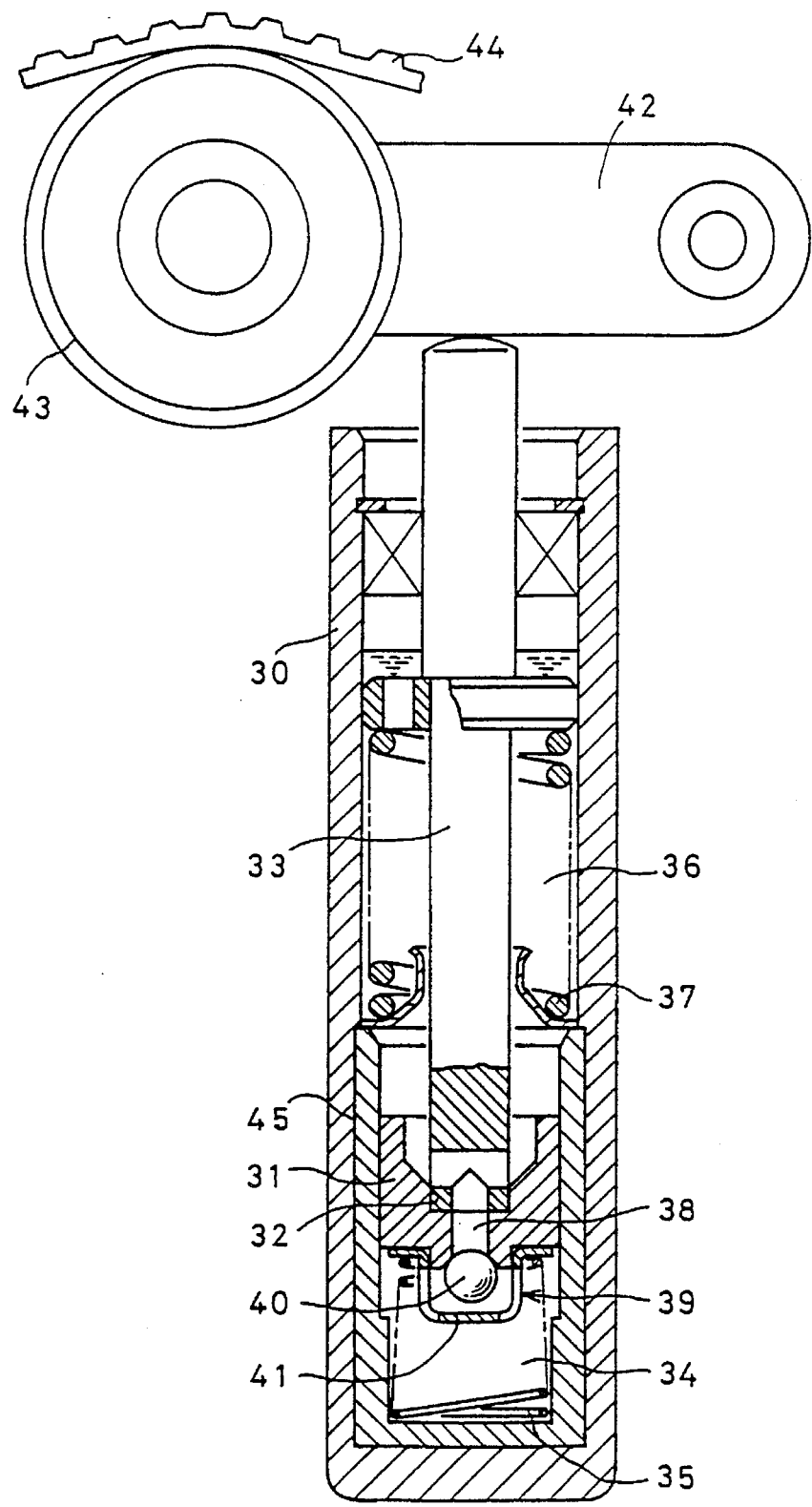
FIG. 6 is a sectional view of a conventional autotensioner.

Similar to conventional autotensioners, this autotensioner is mounted so that the top end of the rod 7 is pressed against the pulley arm 42 shown in FIG. 6.

When the rod 7 is pushed by the pulley arm 42, the pressure of the hydraulic oil in the pressure chamber 4 increases, so that the downward movement of the rod is damped.

When the force urging the plunger 2 downward through the rod 7 exceeds the pressure in the pressure chamber 4, the hydraulic oil in the pressure chamber 4 begins to leak through the gap 3 between the sliding surfaces between the inner casing 1b and the plunger 2, thus allowing the plunger to slowly move toward the bottom of the body 1. When the force urging the plunger downward becomes equal to the spring force of the plunger spring, the plunger 2 stops.

If the belt slackens suddenly, the rod 7 will quickly protrude from the body 1 by being biased by the rod spring 12, thereby eliminating any slackening of the belt.

The plunger 2, biased upward by the plunger spring 15, tends to move upward. But as soon as the plunger begins to move upward, a pressure difference is produced between the reservoir chamber 5 and the pressure chamber 4, which pressure difference acts to compress the plunger spring 15. Partly due to this fact and partly due to the frictional resistance and viscous resistance produced between the plunger 2 and the body 1, the plunger 2 cannot rise as quickly as the rod.

Namely, the rod 7 moves faster upward than the plunger 2, so that the spherical bottom surface 17 of the rod 7 will separate from the valve seat 16, thus opening the return passage 9.

In this state, the hydraulic oil in the reservoir chamber 5 begins to flow through the gap between the valve seat 16 and the spherical surface 17 and the now opened return passage 9 into the pressure chamber 4, so that the plunger 2 can smoothly and quickly move upward until the valve seat 16 is again brought into contact with the spherical surface 17 of the rod 7. It was experimentally confirmed that the optimum spring force of the plunger spring is about 1.0–3.0 kgf if the surface area of the pressure chamber is 1.8 cm$^2$.

Thus, this autotensioner bears the force urging the rod 7 into the body with hydraulic oil in the pressure chamber 4. But when this force disappears, the rod is allowed to protrude quickly. Namely, this autotensioner operates in the same manner as the autotensioner with the conventional check valve shown in FIG. 6.

Figure 4:
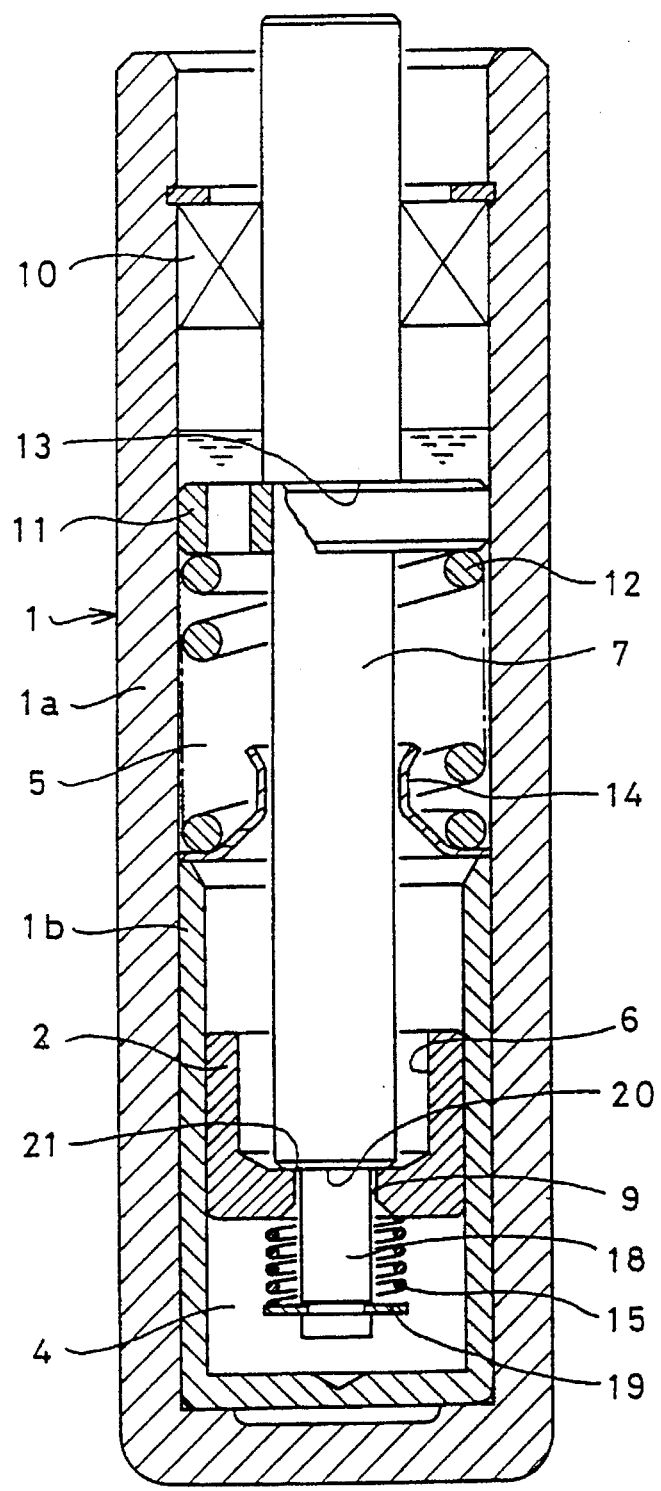
FIG. 4 is a sectional view of a second embodiment of the present invention.

FIG. 4 shows the second embodiment of the hydraulic autotensioner according to this invention. In this embodiment, the rod 7 is provided at its bottom end with a small-diameter shaft portion 18 loosely inserted through the return passage 9. A plunger spring 15 is mounted around the small-diameter shaft portion 18 and retained between a spring support 19 secured to near the bottom end of the shaft portion 18 and the bottom surface of the plunger 2.

The rod 7 has a flat bottom surface 20 which is in close contact with a flat valve seat 21 formed on the bottom of the hole 6.

Otherwise, this embodiment is structurally the same as the first embodiment. Thus, like elements are denoted by like numerals and their description is omitted.

In operation, this embodiment is also the same as the first invention. Thus, the operational description of the second embodiment is also omitted.

In the second embodiment, since the plunger spring 15 is retained between the spring support 19 and the plunger 2, it is possible to insert the plunger 2, rod 7 and plunger spring 15 into the body 1 after assembling them together outside the body 1. Thus, the autotensioner of this embodiment can be assembled easily.

Figure 5:
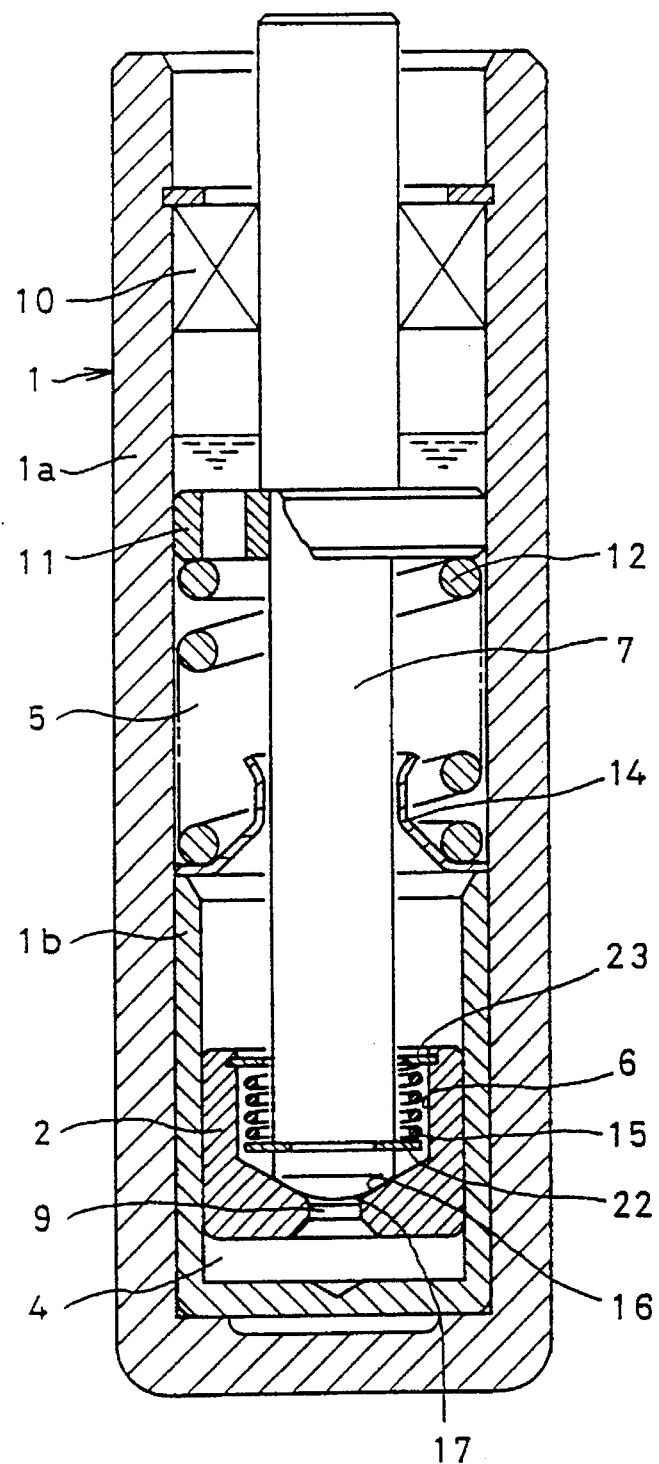
FIG. 5 is a sectional view of a third embodiment of the present invention.

FIG. 5 shows the third embodiment of the hydraulic autotensioner according to this invention. In this embodiment, spring supports 22 and 23 are coupled to near the bottom end of the rod 7 and the inner wall of the plunger 2 near its top end, respectively. The plunger spring 15 is retained between the spring supports 22 and 23.

Otherwise, this embodiment is structurally the same as the first embodiment. Thus, like elements are denoted by like numerals and their description is omitted.

In operation, the third embodiment is also the same as the first embodiment. Thus, the operational description of the third embodiment is also omitted.

In the third embodiment, since the plunger spring 15 is received in the hole 6, there is no need to provide extra space for mounting the plunger spring 15 in the pressure chamber 4. This makes it possible to shorten the pressure chamber 4 and thus the axial length of the entire autotensioner.

The advantages of this invention can be summed up as follows:

The autotensioner of the first embodiment has a plunger and a rod that are relatively movable in the axial direction. The rod is biased by the rod spring in such a direction as to protrude outwardly. The plunger is urged by the plunger spring so that the valve seat formed on the bottom of the rod-receiving hole formed in the plunger is pressed against the bottom end face of the rod. With this arrangement, the plunger and the rod act in cooperation as a check valve, so that there is no need to provide a check valve comprising a ball and a retainer.

Thus, the autotensioner can be formed from a smaller number of parts, so that it can be assembled easily at low cost.

The conventional autotensioner in which its return passage is opened and closed with a check valve having a check ball has a problem in that the gap formed between the check ball and the end of the return passage when the ball is in its open position is so narrow that it takes a long time for the hydraulic oil in the reservoir chamber to flow into the pressure chamber. According to the present invention, the rod performs the function of a check ball of a conventional check valve. A fairly large gap proportional to the relative displacement between the rod and the plunger is formed between the bottom end of the rod and the valve seat, so that the hydraulic oil in the reservoir chamber can quickly flow into the pressure chamber.

Thus, the rod and the plunger of the autotensioner according to the present invention can rise faster than in an autotensioner with a check valve, so that it is possible to absorb any slackening of the belt quickly. For example, the autotensioner according to this invention can eliminate any slackening of the belt when the engine is started in a low-temperature environment. This makes it possible to effectively prevent skipping of teeth and suppress vibrations of the belt.

In the arrangement in which the valve seat is a tapered one while the rod has a spherical bottom surface, the sealing between the valve seat and the rod is improved. Also, with this arrangement, hydraulic oil in the reservoir chamber can more smoothly flow into the pressure chamber when the return passage is opened.

In the arrangement in which the rod-receiving hole is a stepped hole comprising an upper large-diameter portion and a lower small-diameter portion, the rod received in the small-diameter portion of the hole will not move diametrically relative to the plunger. This assures more smooth axial movement of the rod and the plunger.

What is claimed is:

1. A hydraulic autotensioner comprising a body containing hydraulic oil and having a closed bottom, a plunger having a top and a bottom and being slidably mounted in said body with a gap formed therebetween through which hydraulic oil can leak, said plunger being formed with a rod-receiving hole extending from said top of said plunger, and a return passage extending through said plunger from said rod-receiving hole to said bottom of said plunger, a rod having a bottom end inserted in said rod-receiving hole, a rod spring for biasing said rod in such a direction as to protrude out of said body, a plunger spring for urging said plunger against said bottom end of said rod, and a valve seat provided on a surface of said rod-receiving hole so as to be brought into close contact with said bottom end of said rod, whereby said return passage is opened and closed by axial displacement of said rod relative to said valve seat.

2. A hydraulic autotensioner as claimed in claim 1 wherein said plunger spring is retained between said bottom of said plunger and said closed bottom of said body.

3. A hydraulic autotensioner as claimed in claim 2 wherein said valve seat is tapered, and wherein said rod has a spherical bottom surface.

4. A hydraulic autotensioner as claimed in claim 2 wherein said rod-receiving hole is a stepped hole comprising an upper large-diameter portion and a lower small-diameter portion, said small-diameter portion having a diameter substantially equal to the outer diameter of said rod, said plunger being formed with axial grooves in the inner peripheral surface of said small-diameter portion.

5. A hydraulic autotensioner as claimed in claim 1, wherein said valve seat is tapered, and wherein said rod has a spherical bottom surface.

6. A hydraulic autotensioner as claimed in claim 1 wherein said rod-receiving hole is a stepped hole comprising an upper large-diameter portion and a lower small-diameter portion, said small-diameter portion having a diameter substantially equal to the outer diameter of said rod, said plunger being formed with axial grooves in the inner peripheral surface of said small-diameter portion.

7. A hydraulic autotensioner as claimed in claim 1 further comprising a first spring support secured to near said bottom end of said rod and a second spring support secured to an inner wall of said rod-receiving hole near said top of said plunger, wherein said plunger spring is retained between said first and second spring supports.

8. A hydraulic autotensioner as claimed in claim 7 wherein said valve seat is tapered, and wherein said rod has a spherical bottom surface.

9. A hydraulic autotensioner as claimed in claim 1 wherein said bottom end of said rod is provided with a small-diameter shaft portion loosely inserted through said return passage, said small-diameter shaft portion carrying a spring support near its bottom end, said plunger spring being retained between said spring support and a surface of said bottom end of said plunger.

10. A hydraulic autotensioner as claimed in claim 9 wherein said rod-receiving hole is a stepped hole comprising an upper large-diameter portion and a lower small-diameter portion, said small-diameter portion having a diameter substantially equal to the outer diameter of said rod, said plunger being formed with axial grooves in the inner peripheral surface of said small-diameter portion.

* * * * *